United States Patent [19]

Göllner

[11] Patent Number: 5,205,201
[45] Date of Patent: Apr. 27, 1993

[54] DISPLACEMENT CONTROL VALVE

[75] Inventor: Wilhelm Göllner, Neumünster, Fed. Rep. of Germany

[73] Assignee: Sauer, Inc., Ames, Iowa

[21] Appl. No.: 746,907

[22] Filed: Aug. 19, 1991

[51] Int. Cl.$^5$ .................. F15B 13/16; F16D 39/00
[52] U.S. Cl. ........................ 91/387; 60/444; 60/487; 91/505
[58] Field of Search .............. 60/433, 434, 487, 443, 60/444, 447; 91/505, 385, 387, 361, 364; 417/218

[56] References Cited

U.S. PATENT DOCUMENTS

| 3,750,406 | 8/1973 | Verlinde et al. | 60/443 |
| 3,817,033 | 6/1974 | Appel et al. | 60/444 |
| 3,854,847 | 12/1974 | Schlecht | 60/444 |
| 3,901,031 | 8/1975 | Knapp et al. | 60/443 |
| 4,285,358 | 8/1981 | Haydt | 91/387 X |
| 4,395,878 | 8/1983 | Morita et al. | 60/444 |
| 4,476,680 | 10/1984 | Pollman et al. | 60/444 |
| 4,920,748 | 5/1990 | Kordak et al. | 60/444 |

FOREIGN PATENT DOCUMENTS

| 602175 | 7/1960 | Canada | 91/387 |
| 717840 | 2/1942 | Fed. Rep. of Germany | 91/364 |
| 0184748 | 11/1982 | Japan | 60/444 |

Primary Examiner—Edward K. Look
Assistant Examiner—Hoang Nguyen
Attorney, Agent, or Firm—Zarley, McKee, Thomte, Voorhees & Sease

[57] ABSTRACT

A displacement control valve has a valve body with a fluid metering valve spool axially movable between pilot pressure chambers formed at opposite ends of an interior bore in the valve body. An internal spring feedback apparatus is mounted on the valve spool in one of the pilot pressure chambers and elastically interconnects the swashplate of a variable displacement hydraulic unit with the valve spool. An elongated housing surrounds the spring and spring guides and is mechanically coupled with the swashplate. The housing and spring guides form a fluid seal between the valve spool and the valve body to seal the pilot pressure chamber in which the feedback apparatus is mounted.

9 Claims, 2 Drawing Sheets

DISPLACEMENT CONTROL VALVE

TECHNICAL FIELD

This invention relates to a displacement control valve for use in a hydraulic control and, more specifically, to a displacement control valve having an internal spring feedback apparatus which seals a pilot pressure chamber within the control valve.

BACKGROUND ART

Many hydraulic units, such as hydraulic pumps and motors, are of the variable displacement type. Variable displacement hydraulic units often have a rotating cylinder block with axially movable pistons which engage a tiltable swashplate which varies the stroke of the pistons. The displacement of the hydraulic unit is proportional to the stroke of the pistons within the cylinder block and the tilt angle of the swashplate.

In order to selectively prescribe the position of the swashplate, a displacement control is used to vary the swashplate position in response to a command input. Displacement controls take many forms, but in most cases they allow an operator to manually select a desired swashplate position and the corresponding hydraulic unit displacement.

Many displacement controls include a displacement control valve having an internal spool which is axially movable in response to a command input. The command input shifts the valve spool, as by a differential fluid pressure supplied to pilot pressure chambers formed within a valve body at opposite ends of the spool, to port pressurized fluid to a servo mechanism which, in turn, modulates the swashplate position.

In order to limit the displacement of the spool within the displacement control valve, a spring feedback device interconnects the swashplate with the valve spool. As the valve spool shifts relative to the swashplate, the feedback device gradually develops a force which constrains displacement of the spool. Interconnecting a feedback device between a swashplate and displacement control valve is a particularly troublesome design consideration.

One approach to connecting the swashplate and the control valve has been to position a coil spring coaxially over a portion of the valve spool. The spring is maintained in a compressed, preloaded state between a pair of oppositely spaced spring guides contained in an elongated housing or "spring can", which surrounds the valve spool and is positioned in a specially formed central chamber between the pilot pressure chambers. The spring can is coupled with the swashplate and has opposite ends which are adapted to limit axial separation of the spring guides. When the valve spool is displaced relative to the swashplate, a stop formed on the valve spool engages one spring guide and deflects the feedback spring to generate a feedback force opposing further displacement of the valve spool.

One problem which arises with the known device is that, in order to accommodate the feedback apparatus, as well as a number of fluid metering ports, along the length of the valve, a relatively long valve spool and valve body are required. In addition, the axial bore which guides the spool in the valve body is discontinuous due to the interruption of the central chamber. These requirements for the valve spool and valve body result in undesirable manufacturing and performance characteristics. In addition to requiring significant machining, the long spools tend to bend and bind within the valve body to hinder performance of the valve.

Another problem arises in the assembly of the control valve. When installing a valve spool within a valve body, it is desirable simply to insert the spool through one end of an axial bore extending between the pilot pressure chambers. In order to maintain fluid isolation between the pilot pressure chambers, the bore must be just large enough to receive the valve spool, such that opposite ends of the bore are sealed by the valve spool. However, when it is necessary to fit a large feedback apparatus through the bore end, an increased bore diameter is required and the valve spool is not capable of sealing the pilot pressure chamber.

In order to avoid this problem, known devices have segmented valve spools. One segment supports the feedback apparatus and is inserted through an opening in the sidewall of the valve body and is placed directly into the central chamber. End segments are inserted through the axial bore and are connected with the center segment. Obtaining acceptable manufacturing tolerances and adequately joining the several valve spool segments pose significant problems.

The present invention is directed toward overcoming the problems set forth above in a novel and useful way.

SUMMARY OF THE INVENTION

An object, therefore, of this invention is to provide an improved feedback apparatus in the displacement control of a hydraulic unit. Particularly, the feedback apparatus embodies a simple design which facilitates the manufacture and operation of a displacement control valve used in conjunction with the displacement control.

In order to vary the displacement of the hydraulic unit, a tiltable swashplate cooperates with a number of pistons to transmit power from a pressurized fluid to a rotary shaft. The displacement control directs pressurized control fluid to a servo assembly for modulating the swashplate position and varying the amount of power transmitted by the hydraulic unit.

The displacement control includes a control valve having an elongated valve body with an interior axial bore extending between spaced pilot pressure chambers. A valve inlet communicates with a source of pressurized fluid and a number of valve outlets are provided to direct fluid to the servo assembly. A one-piece valve spool is axially movable within the interior bore in response to a differential command pressure delivered to the pilot pressure chambers and selectively ports pressurized fluid received at the valve inlet to the valve outlets. A feedback apparatus according to the present invention is mounted within the valve body and couples the pump swashplate with the valve spool to regulate displacement of the valve spool.

The feedback apparatus is positioned in one of the pilot pressure chambers and includes a coil spring concentric on the valve spool. A cylindrical housing or "can" surrounds the spring in sealed engagement with the valve body and the valve spool and includes a feedback linkage which projects through the valve body and couples the spool with the swashplate.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
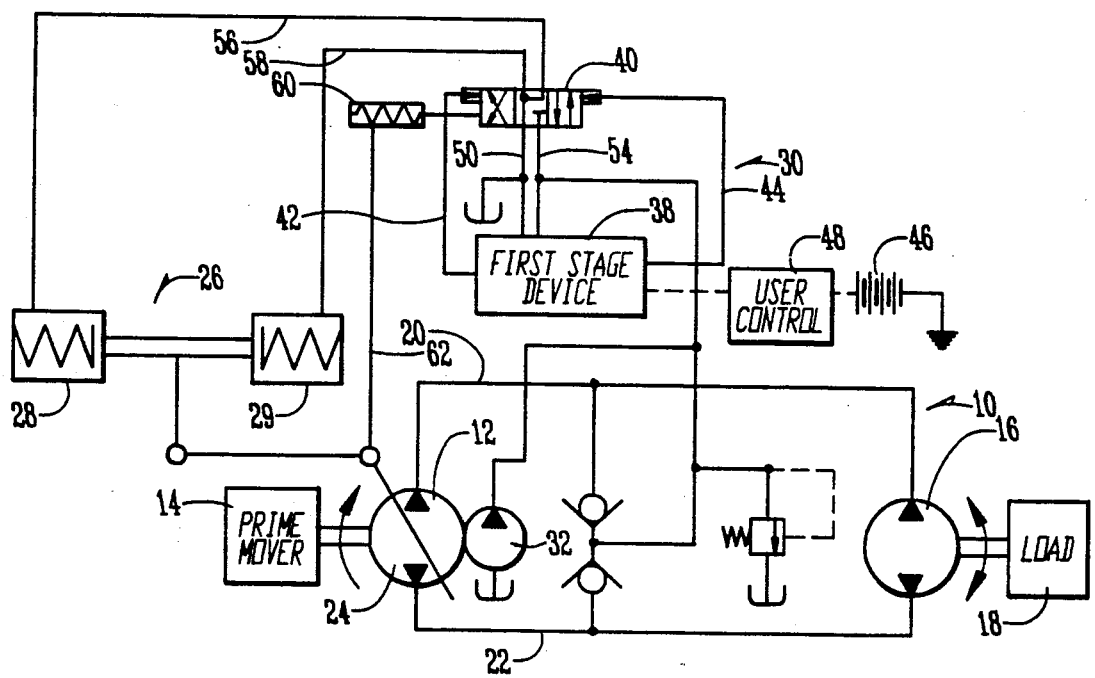
FIG. 1 is a hydraulic circuit diagram of an exemplary hydrostatic transmission utilizing a displacement control valve according to the present invention.

A spring feedback apparatus according to the present invention is designed for use in the displacement control of a variable displacement hydraulic unit, such as a hydraulic pump which is shown, by way of example, in the hydrostatic transmission illustrated schematically in the hydraulic circuit diagram of FIG. 1. A Hydrostatic transmission 10 includes a variable displacement hydraulic pump 12 driven by a prime mover 14 and a motor 16 driving a load 18. The pump and the motor are interconnected by a pair of hydraulic lines 20 and 22 to form a closed loop. Pump 12 is of the reversible variable displacement type as diagrammatically shown to include a swashplate 24 operated by a spring centered servo mechanism 26 including a pair of piston/cylinder arrangements 28 and 29. The position of the swashplate determines the amount and direction of flow from pump 12 to motor 16 to provide a reversible drive of load 18. A displacement control, generally designated 30, is interconnected between the main loop and the servo mechanism to provide control fluid for positioning the swashplate. Such variable displacement hydrostatic transmissions utilizing various types of hydraulic units are well known and need not be described in greater detail relative to understanding the concepts of the present invention.

Displacement control 30 is an electronic control and includes a first stage device 38 and a second stage device 40 connected in a serial arrangement for metering control fluid from a charge pump 32 to servo mechanism 26 to achieve a desired position of swashplate 24. First stage device 38 is a pressure control pilot valve in fluid communication with opposite ends of second stage device 40 by means of lines 42 and 44. An electrical command signal is supplied to the pilot valve from a power source 46 as regulated by a user control 48, with the magnitude of the electrical current supplied to the pilot valve producing a differential pressure dP in lines 42 and 44. Second stage device 40 is a fluid metering displacement control valve according to the present invention and will be described in detail below.

Control fluid is supplied at charge pressure to displacement control valve 40 through a line 54, and tank lines 50 connect the control valve with a tank or reservoir at atmospheric pressure. A pair of servo lines 56 and 58 deliver charge pressure from the displacement control valve to servo piston/cylinder arrangements 28 and 29, respectively, to achieve a desired position of swashplate 24. A feedback means 60 interconnects displacement control valve 40 and swashplate 24 through a linkage means 62 to limit activation of the displacement control valve in a manner which will be understood from the following discussion.

Figure 2:
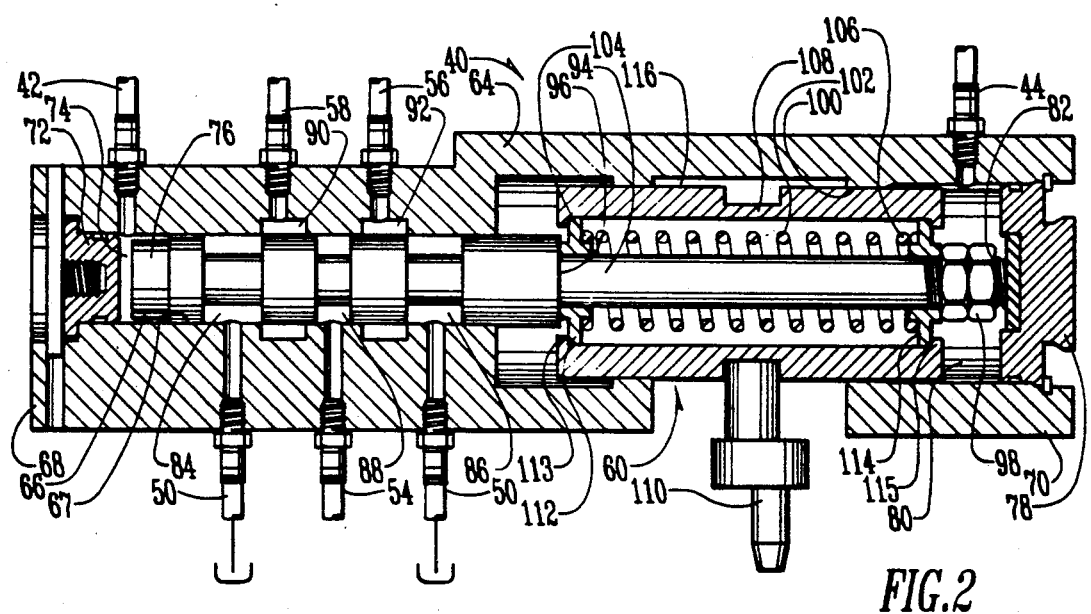
FIG. 2 is an axial section of the displacement control valve in the circuit illustrated in FIG. 1.

Referring to FIG. 2, displacement control valve 40 has an elongated valve body 64 with a valve spool 66 axially movable through an interior cylindrical bore 67 formed in the valve body and extending between opposite valve body ends 68 and 70. Valve body end 68 is sealed by a plug 72 to define an internal pilot pressure chamber 74 at an end 76 of valve spool 66. Valve body end 70 is sealed by a plug 78 to define an internal pilot pressure chamber 80 at an end 82 of the valve spool. Fluid line 42 communicates with pilot pressure chamber 74 and fluid line 44 communicates with pilot pressure chamber 80, such that the pressure differential dP produced by pilot valve 38 acts against opposite spool ends 76 and 82, respectively, to displace valve spool 66 within interior bore 67.

Valve spool 66 has a number of axially spaced lands to define a pair of isolated outlet ports 84 and 86 connected to tank lines 50 and an inlet port 88 communicating with charge pressure in line 54. Valve body 64 has a pair of axially spaced annular servo ports 90 and 92 communicating respectively with servo piston/cylinder arrangements 28 and 29 by means of lines 58 and 56, respectively. Valve spool 66 is axially displaced by means of differential pressure dP supplied to opposite pilot pressure chambers 74 and 80 to selectively interconnect inlet port 88 with a corresponding servo port 90 or 92 to supply charge pressure to servo mechanism 26 and achieve a desired displacement of swashplate 24.

As shown in FIG. 2, valve spool 66 has a narrow end portion 94 projecting from an annular shoulder 96 formed on the spool at approximately mid-length thereof and supporting feedback means 60. Feedback means 60 is mounted substantially coaxial with the valve spool and is sandwiched between shoulder 96 and a retaining nut 98 on valve spool end 82. The feedback means extends into pilot pressure chamber 80 in sealing engagement with an inner cylindrical sidewall 100 of interior bore 67 to seal pilot pressure chamber 80 and maintain fluid isolation from opposite pilot pressure chamber 74.

Feedback means 60 includes a coil spring 102 mounted concentrically about spool portion 94 and extending between opposite spring ends 104 and 106. An elongated, generally cylindrical housing or "can" 108 surrounds spring 102 and extends slightly beyond the ends thereof, with a rigid link 110 projecting laterally from the housing for engagement with swashplate 24, as by the linkage means 62 represented schematically in FIG. 1. A spring guide 112 is movably mounted on the valve spool in abutting relationship with shoulder 96 and extends between spring end 104 and a retaining lip 113 formed on housing 108. A second spring guide 114 is oppositely spaced along the valve spool from spring guide 112 in abutting relationship with retaining nut 98 and extends between spring end 106 and a retaining lip 115 formed on housing 108.

It is believed that operation of displacement control 30 and feedback means 60 can be well understood from the foregoing description and may be summarized as follows. When it is desired to vary the displacement of pump 12 as by changing the position of swashplate 24, user control 48 is manually actuated to supply an electrical current to first stage pilot valve 38. The pilot valve generates a differential command pressure dP across lines 42 and 44 in linear proportion to the electrical current. The differential pressure acts against opposite ends 76 and 82 of valve spool 66 to axially shift the valve spool within valve body 64 to selectively interconnect inlet charge pressure port 88 with one of servo ports 90 and 92 to energize servo mechanism 26 and thereby position swashplate 24.

In order to limit the axial displacement of valve spool 66 under the influence of differential command pressure dP, feedback means 60 acts to bias the valve spool toward a steady state fluid metering position within valve body 64. Through feedback link 110, a change in the position of swashplate 24 as prescribed by servo mechanism 26 results in the axial shifting of housing 108 relative to valve spool 66. For purposes of the following description, it will be presumed that a change in swashplate position induces a relative right-to-left shift of housing 108.

As housing 108 is displaced to the left, retaining lip 115 biases spring guide 114 away from retaining nut 98 and against spring end 106. Spring guide 112 is constrained against shoulder 96 on the valve spool, and the spring is thereby continually compressed as the housing is displaced relative to the valve spool. When the force built up within the compressed spring balances the pressure differential acting against the opposite spool ends, the spool and the swashplate assume a steady state position. It should be fully understood, of course, that the displacement control works similarly when a commanded change in swashplate position induces a left-to-right relative displacement of housing 108.

As noted above, housing 108 is generally cylindrical and has an arcuate outer sidewall 116 well suited for sealing engagement with the complementarily cylindrical sidewall 100 of interior bore 67. The fluid seal formed by housing 108 between valve body 64 and valve spool 66 prevents displacement of hydraulic fluid through the opening through which feedback link 110 extends and permits the positioning of the feedback means within pilot pressure chamber 80, thereby accommodating a displacement control valve having a relatively short valve spool and interior bore. The shorter components reduce the amount of time and effort required to manufacture the parts, as well as reduce the likelihood of the valve spool bending within the valve body and binding against the sides of the interior bore. This invention also obviates the need for a specially formed chamber within the valve body for housing the feedback means.

Because the feedback means is mounted at one end of the valve spool, it is possible to assemble the spool and the feedback means outside the valve and insert the assembly through a pilot pressure chamber at one end of the interior bore. It therefore is possible to use a one-piece valve spool and eliminate the manufacturing hindrances associated with the segmented valve spools shown in the prior art.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A displacement control valve for use in a control for a variable displacement hydraulic unit, the control having command input means for generating a differential command pressure representative of a desired hydraulic unit displacement and servo means for varying the displacement of the hydraulic unit, the displacement control valve comprising:

an elongated valve body, having a lateral opening with an interior bore communicating at opposite ends with the differential command pressure;

inlet means communicating the valve body with a source of pressurized fluid;

outlet means for directing pressurized fluid from the valve body to the servo means;

a valve spool axially moveable within the interior bore in response to the differential command pressure to interconnect the inlet means and the outlet means; and feedback means, having an elastic component and a non-elastic component, for elastically coupling the valve spool through said lateral opening with the variable displacement hydraulic unit and said elastic component being movably mounted in sealed engagement with the interior of the valve body.

2. The displacement control valve of claim 1 in which the valve spool has spaced stops along the length thereof to restrict axial movement of the feedback means along the valve spool.

3. The displacement control valve of claim 2 in which the feedback means include an elongated housing having an arcuate sidewall in sealed engagement with the valve body and a pair of spaced spring guides mounted on the valve spool within the housing and adjacent the stops on the valve spool, the spring guides each having an opening through which the valve spool extends.

4. The displacement control valve of claim 3 in which the spring guides are axially movable along the valve spool within the housing, and the feedback means include a spring means positioned between the spring guides to oppositely bias the spring guides against the opposite housing ends.

5. In a control for a variable displacement hydraulic unit, the control having command input means for selectively generating a differential command pressure representative of a desired hydraulic unit displacement and servo means for varying the displacement of the hydraulic unit, the control also including a displacement control valve having an elongated valve body with an interior bore communicating at opposite ends with the differential command pressure, inlet means in communication with a source of pressurized fluid, outlet means for directing a pressurized flow to the servo means, and a valve spool axially moveable within the interior bore in response to the differential command pressure to interconnect the inlet means and the outlet means, the improvement comprising feedback means coupled with the variable displacement hydraulic unit through a lateral opening in the valve body and movably mounted in sealed engagement with the valve body.

6. A displacement control valve for a variable displacement hydraulic unit having command input means for generating a differential command pressure representative of a desired hydraulic unit displacement and servo means for varying the displacement of the hydraulic unit, the displacement control valve comprising:

an elongated valve body having an interior bore with a pair of spaced apart ends, a first fluid chamber with a lateral opening formed at one of the bore ends and a second fluid chamber formed at the other of the bore ends, each of the fluid chambers being in communication with the differential command pressure;

an inlet intermediate the first and second fluid chamber and in communication with a source of pressurized fluid;

an outlet intermediate the first and the second fluid chambers for directing pressurized fluid received at the valve inlet to the servo means;

a valve spool having a first end received in the first fluid chamber and a second end received in the second fluid chamber, the valve spool being axially moveable between the fluid chambers in response to the differential command pressure at each end thereof to alternatively interconnect the valve inlet with either of the valve outlets; and feedback means coupled through a lateral opening in the valve body with the variable displacement hydraulic unit and positioned in the first fluid chamber in sealed engagement with the valve body.

7. The displacement control valve of claim 6 in which the feedback means include a substantially cylindrical housing movable relative to the valve spool and having an elongated arcuate sidewall, the valve body being engaged with a portion of the length of the sidewall to constrain axial movement of the housing within the valve body.

8. The displacement control valve for a variable displacement hydraulic unit having command input means for generating a differential command pressure representative of a desired hydraulic unit displacement, and servo means for varying the displacement of the hydraulic unit, the displacement control valve comprising:

an elongated valve body having a lateral opening and an interior bore extending between first and second fluid chambers, each of the fluid chambers communicating with the differential command pressure;

inlet means in communication with a source of pressurized fluid;

outlet means for directing a pressurized fluid to the servo means;

a one-piece valve spool extending between the first and the second fluid chambers and axially moveable within the interior bore in response to the differential command pressure to interconnect the inlet means and the outlet means; and feedback means including a spring mounted on the valve spool in one of the fluid chambers and surrounded by a spring housing coupled through a lateral opening in the valve body with the swashplate and movably mounted on the valve spool in sealed engagement with the valve body.

9. The displacement control valve of claim 1 wherein said lateral opening is sealed from said interior bore of the valve body by said elastic component of the feedback means engaging the interior of said valve body and said elastic component having an external transverse groove accessible through said lateral opening for receiving said non-elastic component of the feedback means.

* * * * *

UNITED STATES PATENT AND TRADEMARK OFFICE
CERTIFICATE OF CORRECTION

PATENT NO. : 5,205,201
DATED : April 27, 1993
INVENTOR(S) : Wilhelm Gollner

It is certified that error appears in the above-identified patent and that said Letters Patent is hereby corrected as shown below:

Title page,
Item, "[73]" should be shown as follows:
- [73] Assignee: Sauer Inc., Ames, Iowa -

Signed and Sealed this

Thirty-first Day of July, 2001

*Attest:*

*Attesting Officer*

NICHOLAS P. GODICI
*Acting Director of the United States Patent and Trademark Office*